No. 679,854. Patented Aug. 6, 1901.
J. W. MILLER.
HARROW.
(Application filed Mar. 22, 1901.)

(No Model.)

Witnesses
Jos H. Blackwood
D. Randolph Jr.

Inventor
Jacob W. Miller
by D. A. Gourick
Asso-Attorney

THE NORRIS PETERS CO., PHOTO-LITHO., WASHINGTON, D. C.

UNITED STATES PATENT OFFICE.

JACOB W. MILLER, OF MARION, OHIO, ASSIGNOR OF ONE-HALF TO EDWARD HUBER, OF SAME PLACE.

HARROW.

SPECIFICATION forming part of Letters Patent No. 679,854, dated August 6, 1901.

Application filed March 22, 1901. Serial No. 52,365. (No model.)

*To all whom it may concern:*

Be it known that I, JACOB W. MILLER, a citizen of the United States, residing at Marion, in the county of Marion and State of Ohio, have invented a certain new and useful Improvement in Harrows, of which the following is a specification.

My invention relates to harrows, and particularly to the teeth thereof and the means of attaching them to the beams of the implement, and has for its object to provide a harrow-tooth and means for fastening same that will hold the tooth in a rigid position in the beam and prevent it from working out while the harrow is in operation and yet will permit of instantaneous removal of the tooth when desired that is strong and substantial, easy in operation, and reasonable in cost of construction.

Figure 1:
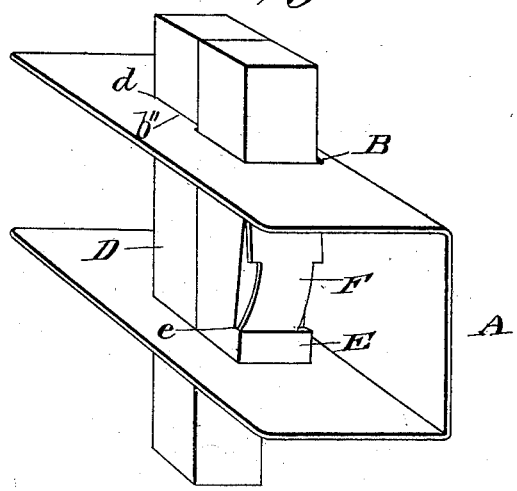
Figure 2:
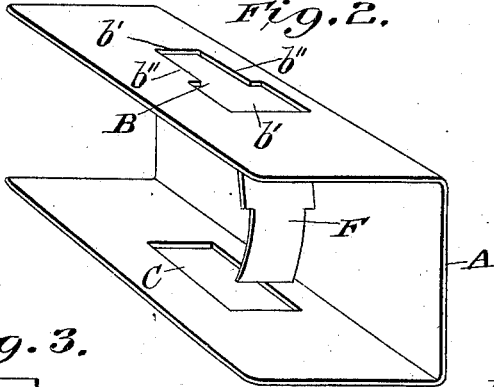
Figure 3:
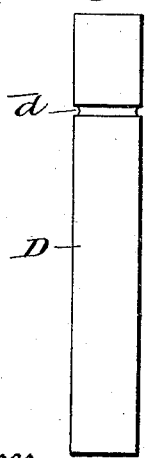
Figure 4:
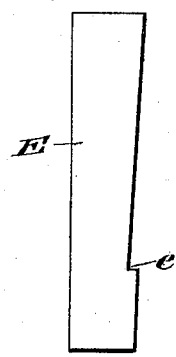

Referring to the drawings, Figure 1 is a view in perspective of a portion of a harrow-beam, showing a portion of a tooth in position. Fig. 2 is a view in perspective of a portion of the harrow-beam, showing the openings for reception of the harrow-tooth; Fig. 3, a view of a tooth; Fig. 4, a view of the locking-wedge.

In the drawings, in which similar letters of reference denote like parts throughout the several views, A represents the beam of a harrow, made of channel-iron, having rectangular openings B C in the flanges. The opening B on the top of the beam is made with one end $b$ larger than the other end $b'$. It will be seen by this construction that there are provided projections $b''$ in the opening B. The opening C is made preferably of the same width throughout its length, though slightly shorter than the opening B.

D represents the tooth of a harrow, having lateral grooves $d$ on its four sides near the top.

E represents a wedge-shaped piece of metal having a notch $e$ formed in one side.

F is a spring that may be formed by the portion of the beam A that is cut out to form the hole B, turned down on one of its edges, or by a piece of spring-steel riveted to the beam.

The operation is as follows: The tooth D is passed through the part $b$ of the opening B and the opening C until the grooves $d$ are opposite the projections $b''$. The tooth D is then pushed into the opening $b'$. The wedge E is then pushed into the opening $b$ and C until the spring F comes in contact with the notch $e$ and the tooth is securely fastened in place. To remove the tooth, a pointed instrument of any kind, such as a screw-driver, is inserted between the wedge E and spring F and the spring F bent away from the notch $e$. The wedge can then be withdrawn and the tooth removed.

I do not wish to be confined to the exact construction set out in the above specification and shown in the drawings, as the same may be altered somewhat without departing from the spirit of my invention. Especially it may be found desirable to limit the number of grooves $d$ on the tooth D to one or two or three instead of four and have but one projection $b''$ in the opening B.

Having thus described my invention, what I claim is—

1. In a harrow, a beam provided with an elongated rectangular opening, one end of which is narrower than the other end, and means, attached to said beam, for securing a tooth in said beam, as and for the purpose shown and described.

2. In a harrow, a beam provided with an elongated opening having its opposite sides parallel, and one end narrower than the other end, and a leaf-spring, attached to said beam, for securing a tooth in said beam, as and for the purpose shown and described.

3. In a harrow, a beam having parallel flanges, a rectangular opening in each of said flanges, and a spring fixed to one of said flanges, substantially as shown and described.

4. In a harrow, a beam made of channel-iron, a rectangular opening in one of its flanges one end of which is narrower than the other end, and a rectangular opening in its other flange opposite the first-named opening, substantially as shown and described.

5. In a harrow, the combination of a beam having parallel walls, rectangular openings in said walls, a tooth having lateral grooves thereon, a notched wedge, and a spring on one of said walls, as and for the purpose shown and described.

6. In a harrow, a beam having parallel flanges, a rectangular opening in one of its flanges, a spring adjacent to said opening, and a rectangular opening in the other flange, substantially as shown and described.

7. In a harrow, a beam with parallel flanges, an elongated opening in one of its flanges, the opposite sides of said opening parallel and one end narrower than the other end, a spring adjacent to the larger end of said opening extending between the flanges, and an elongated opening with parallel sides in the other flange opposite to the first-named opening, substantially as shown and described.

8. In a harrow, a beam made of channel-iron, a portion of one of the flanges thereof cut out to form a rectangular opening therein, said portion turned down on one of its edges to form a spring, and a rectangular opening in the other flange, substantially as shown and described.

9. In a harrow, a beam made of channel-iron, a rectangular opening cut out of one of the flanges thereof, one end of which is narrower than the other end, the portion cut out being turned, between the flanges of said channel-iron, at the wider edge and curved to form a leaf-spring, and a rectangular opening in the other flange, substantially as shown and described.

10. In a harrow, the combination of a beam, an elongated opening therein, one end of said opening narrower than the other end, a tooth provided with lateral grooves, a notched wedge, and means for retaining said parts in an assembled position, substantially as shown and described.

11. In a harrow, the combination of a beam, an elongated opening therein, one end of said opening narrower than the other end, a spring adjacent to said opening, a tooth provided with lateral grooves, and a notched wedge, substantially as shown and described.

12. In a harrow, the combination of a beam made of channel-iron, a rectangular opening cut out of one of its flanges, the cut-out portion turned between the flanges of said channel-iron and curved to form a leaf-spring, a tooth provided with lateral grooves, and a notched wedge, substantially as shown and described.

In testimony whereof I hereto affix my signature in the presence of two witnesses.

JACOB W. MILLER.

Witnesses:
G. E. MANSER,
CHAS. E. WYATT.